March 1, 1932.  E. LEVY, NEE PASCHEK  1,847,840

BOX FOR COSMETICS

Filed July 17, 1930

INVENTOR:
Elly Levy, née Paschek

By: Marks & Clerk
ATTYS.

Patented Mar. 1, 1932

1,847,840

UNITED STATES PATENT OFFICE

ELLY LEVY, NÉE PASCHEK, OF BERLIN-WILMERSDORF, GERMANY

BOX FOR COSMETICS

Application filed July 17, 1930, Serial No. 468,666, and in Germany June 13, 1930.

My invention relates to improvements in boxes for cosmetics, and more particularly in boxes for loose powder comprising a foraminated disk located on the cosmetic, and mechanical means for pressing small amounts of the loose powder through the holes of the disk. The object of the improvements is to provide a member in the form of a propeller having symmetrical wings and adapted to press the cosmetic through the holes of the disk when rotating the same in one or the other direction.

Figure 1:
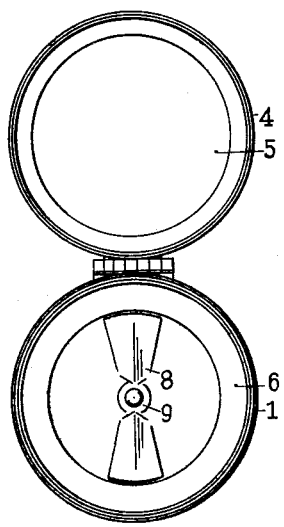
Figure 2:
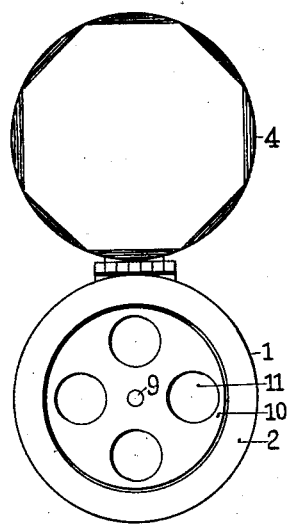
Figure 3:
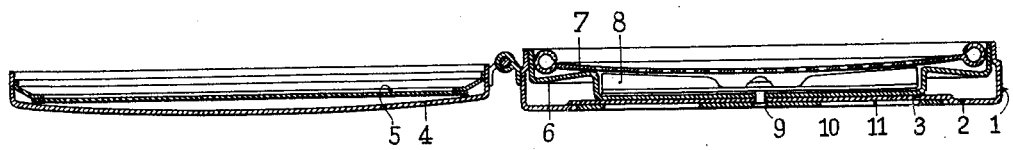
Figure 4:
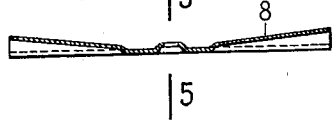
Figure 5:
Figure 6:
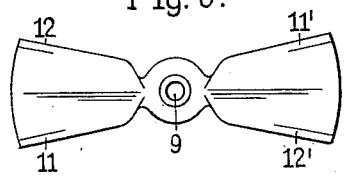

For the purpose of explaining the invention an example embodying the same has been shown in the accompanying drawings, in which the same letters of reference have been used in all the views to indicate corresponding parts. In said drawings, Fig. 1 is a top plan view showing the box open, the foraminated disk being removed, Fig. 2 is a bottom view of the open box showing the disk for operating the scraper, Fig. 3 is a sectional elevation on an enlarged scale and taken on the line 3—3 of Fig. 1, the foraminated disk being located within the box, Fig. 4 is a sectional elevation showing the scraper, Fig. 5 is a sectional elevation taken on the line 5—5 of Fig. 4, and Fig. 6 is a top plan view of Fig. 4.

In the example shown in the figures the box comprises a body 1 having the median part of the bottom 2 pressed inwardly to provide a circular recess 3, and a lid 4 hinged to the body 1, which lid may be provided for example with a mirror 5. Within the body of the box a container 6 in the form of a flat dish and made from a suitable material such as aluminium is fixed, which container is designed for receiving the powder. After filling the powder into the container 6 a foraminated disk 7 having an upturned margin is placed into the same and on the surface of the powder. On the bottom of the container 6 a scraper 8 is located by means of which the loose powder is pressed through the holes of the disk 7, and to a central pivot bolt 9 of the said scraper passed through a central hole of the bottom 2 a disk 10 is secured which is embedded in the circular recess 3, and which is formed with holes 10 for inserting the fingers of the hand in order to turn the scraper in one or the other direction. Upon rotation of the scraper in either direction a small amount of the loose powder is pressed from the container 6 through the holes of the disk 7. The scraper 8 is equipped with two arms 11, 12 and 11', 12', both inclined from a diametrical line to opposite sides, so that the inclined portions 11, 11' of the scraper supply the power when turning the same in one direction, while the inclined portions 12, 12' supply the powder when turning the scraper in the opposite direction. The radial edges of the portions 11, 12 and 11', 12' are slightly curved or flattened so that there are no sharp edges sliding on the bottom of the container 6. Therefore they are adapted to take the powder from the bottom of the said container even if the container is almost empty.

In order to prevent spoiling of the mirror 5 by the powder when closing the box, I place a powder puff or pad on the disk 7 which may likewise be used for applying the powder to the skin, and the outer margin of which is in tight engagement with the inner margin of the disk 7.

I claim:

1. A box for dispensing cosmetics, comprising the body of the box, a foraminated disk within said box and spaced from the bottom thereof, a rotary scraper between said disk and the bottom of said box in the form of a propeller having its arms inclined in opposite directions from a diametrical line for supplying a part of the cosmetic through the holes of said disk upon rotation in either direction, and a rotary operating member on the outside of the bottom of said box connected with said scraper for rotating the same.

2. A box for dispensing cosmetics, comprising the body of the box, a foraminated disk within said box and spaced from the bottom thereof, a rotary scraper between said disk and the bottom of said box, said scraper including arms each having the opposed portions thereof oppositely inclined and adapted when turned to force a part of the cosmetic through the holes of said disk, and a rotary operating member on the outside of the bottom of said box connected with said scraper for rotating the same, said operating member having portions thereof constituting finger holes.

In testimony whereof I hereunto affix my signature.

ELLY LEVY, GEB. PASCHEK.